(12) United States Patent
Murase et al.

(10) Patent No.: US 10,681,240 B2
(45) Date of Patent: Jun. 9, 2020

(54) READING MODULE, AND IMAGE READING DEVICE AND IMAGE FORMING APPARATUS THEREWITH

(71) Applicant: KYOCERA Document Solutions Inc., Osaka (JP)

(72) Inventors: Takaaki Murase, Osaka (JP); Kei Ouchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 172 days.

(21) Appl. No.: 16/055,487

(22) Filed: Aug. 6, 2018

(65) Prior Publication Data

US 2019/0045073 A1 Feb. 7, 2019

(30) Foreign Application Priority Data

Aug. 7, 2017 (JP) ................. 2017-152140

(51) Int. Cl.
| | |
|---|---|
| *H04N 1/00* | (2006.01) |
| *H04N 1/193* | (2006.01) |
| *H04N 1/195* | (2006.01) |
| *G02B 26/08* | (2006.01) |
| *G02B 13/22* | (2006.01) |

(52) U.S. Cl.
CPC ....... *H04N 1/1937* (2013.01); *H04N 1/19531* (2013.01); *H04N 1/19547* (2013.01); *G02B 13/22* (2013.01); *G02B 26/0816* (2013.01)

(58) Field of Classification Search
CPC .................................................. H04N 1/1937
See application file for complete search history.

(56) References Cited

U.S. PATENT DOCUMENTS

| | | | | |
|---|---|---|---|---|
| 6,078,419 A | * | 6/2000 | Atsuumi ................... | B41J 2/471 359/207.1 |
| 8,345,325 B2 | * | 1/2013 | Schmidt .................... | H04N 1/03 358/475 |
| 2005/0110972 A1 | * | 5/2005 | Tsuji ...................... | G03B 27/54 355/67 |
| 2010/0284045 A1 | * | 11/2010 | Kawano ................. | G03B 27/50 358/474 |

FOREIGN PATENT DOCUMENTS

JP 2003-121608 A 4/2003

\* cited by examiner

*Primary Examiner* — Benjamin O Dulaney
(74) *Attorney, Agent, or Firm* — Stein IP, LLC

(57) ABSTRACT

According to the present disclosure, a reading module includes a light source, an optical system, and a sensor. The optical system images, as image light, reflection light of light with which the light source has irradiated a document. The sensor converts the thus imaged image light into an electric signal. The optical system includes a mirror array in which a plurality of reflection mirrors are connected together, and a plurality of aperture stop portions. The reflection mirrors each reflect light at an angle that is different, as seen in a main scanning direction, from an angle at which an adjacent one of the reflection mirrors reflects light. The plurality of aperture stop portions are disposed on one side of the mirror array with respect to an orthogonal direction which is orthogonal to the main scanning direction.

10 Claims, 5 Drawing Sheets

READING MODULE, AND IMAGE READING DEVICE AND IMAGE FORMING APPARATUS THEREWITH

INCORPORATION BY REFERENCE

This application is based upon and claims the benefit of priority from the corresponding Japanese Patent Application No. 2017-152140 filed on Aug. 7, 2017, the entire contents of which are incorporated herein by reference.

BACKGROUND

The present disclosure relates to a reading module that is used in digital copiers, image scanners, etc., and that irradiates a document with light and reads image light reflected from the document, and the present disclosure also relates to an image reading device and an image forming apparatus provided with such a reading module.

Conventional reading methods that have been adopted in image reading devices incorporated in copiers and the like employing the electro-photographic process include the CCD method, in which a charge-coupled device called a CCD sensor is used, and the CIS method, in which a photoelectric conversion element called a CMOS(Complementary MOS) sensor is used.

In the CCD method, image reading is performed by imaging a reduced image of a document, on an image sensor having a size that is one-fifth to one-ninth as large as that of a document, by using a plurality of flat mirrors and an optical lens. Merits of the CCD method include an advantage of a deep depth of field. Here, the depth of field is the range in which, even when a subject (here a document) is displaced in the direction of the optical axis from the in-focus position, the subject can be seen as if in focus. This means that, with a deep depth of field, even when the document is displaced from a normal position, it is possible to obtain an image comparable to an image that would be obtained when the document is located at the normal position.

On the other hand, demerits of the CCD method include a very long optical path length (which is a distance over which light travels from a subject to the sensor), which is 200 to 500 mm. In image reading devices, for the purpose of securing the optical path length in a limited space in a carriage, a plurality of plane mirrors are used to change the direction in which light travels. Thus, image reading devices incorporate a large number of components, which results in high cost. Further, in a case where a lens is used in an optical system, chromatic aberration is caused by variation in refractive index with wavelength. To correct such chromatic aberration, it is necessary to provide a plurality of lenses. Using a plurality of lenses in this manner also results in high cost.

In the CIS method, image reading is performed by imaging an image, on an image sensor having a size similar to that of a document, by using a plurality of erect-image rod-lenses with unity magnification arranged in an array. Merits of the CIS method include a comparatively short optical path, which is 10 mm to 20 mm, which is shorter than that of the CCD method, and thus helps achieve compact image reading devices. Furthermore, imaging by use of rod lenses alone eliminates the need for mirrors, which are required for imaging in the CCD method, and this helps achieve a thin and simple-structured scanner unit incorporating a CIS sensor, and the simple structure contributes to cost reduction. On the other hand, in the CIS method, the depth of field is so small that, when the document is displaced from the normal position in the optical axis direction, a severe blur results from image bleeding due to magnification difference between the individual lenses. This results in a demerit of the CIS method, that is, incapability of uniformly reading a book document or a document with an uneven surface.

In recent years, a method has been proposed which is different from the CCD method and the CIS method described above in that image reading is performed by employing a reflection mirror array in an imaging optical system. In this method, a plurality of reflection mirrors are arranged in an array, and a document read in different reading regions corresponding to the reflection mirrors on a region-by-region basis is formed into an inverted reduced image on a sensor. However, unlike in the CIS method where a rod-lens array is used, one region is read and imaged with one optical system. Further, by adopting a telecentric optical system in the imaging method, in reading a plurality of regions of a document on a region-to region basis, there occurs no image bleeding, which would otherwise be caused due to overlapping of images of different magnifications with each other, and thus image blurring is reduced and a compound-eye reading method is achieved.

Furthermore, unlike in a case where a lens is used in the optical system, this method, where the optical system is constituted by mirrors alone, suffers no chromatic aberration. Thus, there is no need of chromatic aberration correction, and this helps reduce the number of elements constituting the optical system.

SUMMARY

According to a first aspect of the present disclosure, a reading module includes a light source, an optical system, and a sensor. The light source irradiates a document with light. The optical system images, as image light, reflection light of the light with which the light source has irradiated the document. The sensor has a plurality of imaging regions which convert the image light imaged by the optical system into an electric signal. The optical system includes a mirror array in which a plurality of reflection mirrors, each having a reflection surface formed as an aspherical concave surface, are connected together in an array in a main scanning direction, and a plurality of aperture stop portions which are each provided between one of the reflection mirrors and one of the imaging regions of the sensor, and adjust an amount of the image light reflected from the reflection mirrors. The reflection mirrors are each provided so as to reflect light at an angle that is different, as seen in the main scanning direction, from an angle at which an adjacent one of the reflection mirrors reflects light, the plurality of aperture stop portions are disposed on one side of the mirror array with respect to an orthogonal direction which is orthogonal to the main scanning direction, and the imaging regions are each disposed so as not to overlap with an adjacent one of the imaging regions in the orthogonal direction.

Still other objects of the present disclosure and specific advantages provided by the present disclosure will become further apparent from the following descriptions of embodiments.

DETAILED DESCRIPTION

Figure 1:
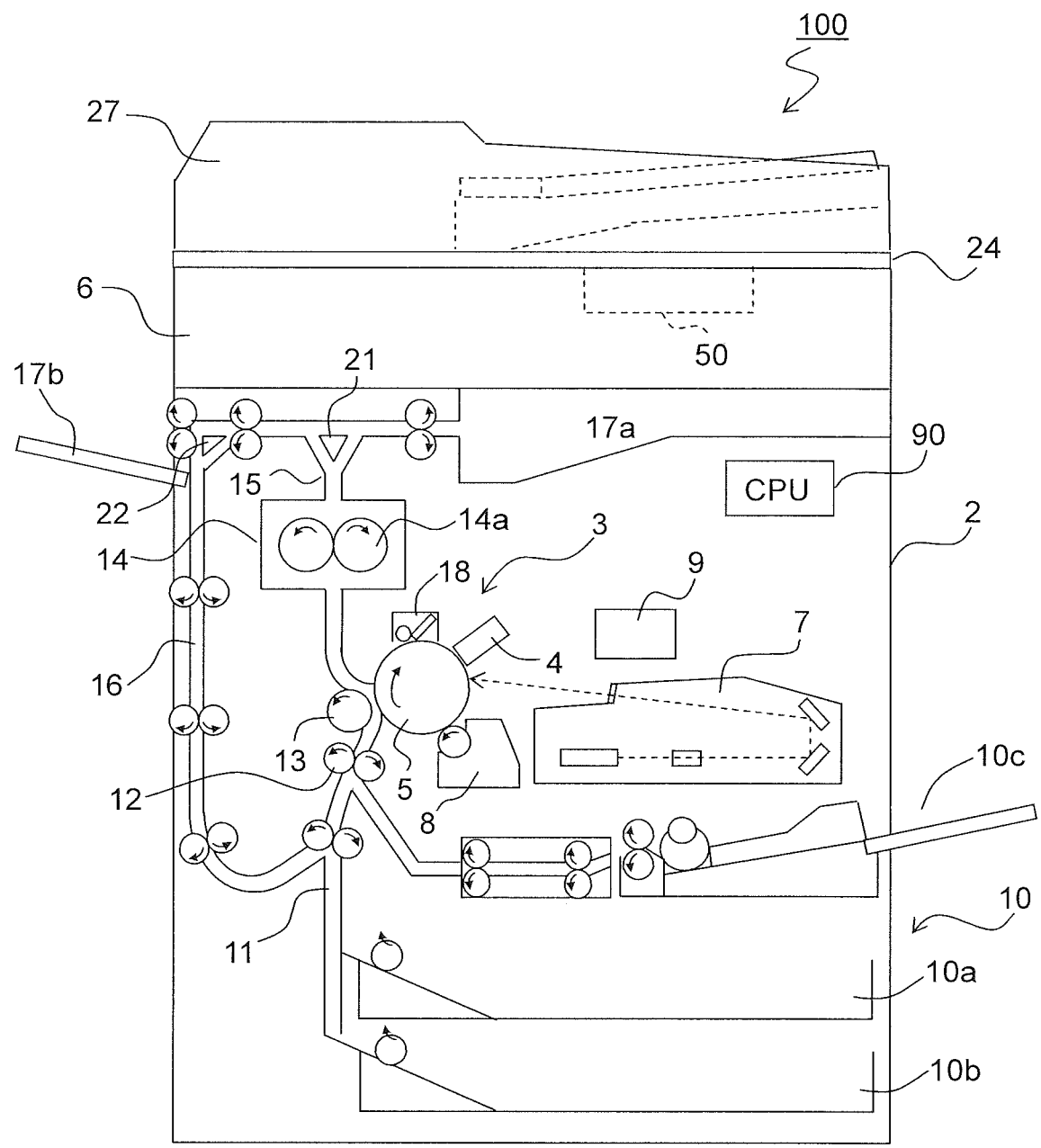
FIG. 1 is a side sectional view of an overall structure of an image forming apparatus 100 provided with an image reading portion 6 employing a reading module 50 according to the present disclosure.

Hereinafter, embodiments of the present disclosure will be described with reference to the drawings. FIG. 1 is a diagram schematically illustrating a configuration of an image forming apparatus 100 provided with an image reading portion 6 which employs a reading module (a reading device, an image reading unit) 50 of the present disclosure. In FIG. 1, in the image forming apparatus 100 (here, a digital multifunction peripheral (MFP) is shown as an example), in a copy operation, document image data is read and converted into an image signal in the image reading portion 6, which will be described later. On the other hand, in an image forming portion 3 within an MFP main body 2, a photosensitive drum 5, which rotates in a clockwise direction in FIG. 1, is electrostatically charged uniformly by a charging unit 4. Then, with a laser beam emitted from an exposure unit (such as a laser scanning unit) 7, an electrostatic latent image is formed on the photosensitive drum 5 based on the document image data read at the image reading portion 6. Next, developer (hereinafter referred to as toner) is caused to adhere to the resulting electrostatic latent image by a developing unit 8, whereby a toner image is formed. The toner is supplied to the developing unit 8 from a toner container 9.

Toward the photosensitive drum 5 on which the toner image has been formed as described above, a sheet is conveyed, from a sheet feeding mechanism 10 via a sheet conveyance path 11 and a registration roller pair 12, to the image forming portion 3. The sheet feeding mechanism 10 includes sheet feeding cassettes 10a and 10b, and a stack bypass (a manual feeding tray) 10c provided above the sheet feeding cassettes 10a and 10b. The conveyed sheet passes through a nip portion between the photosensitive drum 5 and a transfer roller 13 (an image transfer portion), and thereby the toner image formed on the surface of the photosensitive drum 5 is transferred onto the conveyed sheet. Then, the sheet having the toner image transferred thereon is separated from the photosensitive drum 5, to be conveyed to a fixing portion 14 having a fixing roller pair 14a, where the toner image is fixed on the sheet. The sheet is then guided into one of different conveyance directions by path switching mechanisms 21 and 22, which are provided at branch points in a sheet conveyance path 15, and then the sheet is discharged as it is (or after being sent to a reverse sheet conveyance path 16 and subjected to two-sided copying) onto a sheet discharge portion including a first discharge tray 17a and a second discharge tray 17b.

Residual toner remaining on the surface of the photosensitive drum 5 after the transfer of the toner image is removed by a cleaning device 18. Residual electrostatic charge remaining on the surface of the photosensitive drum 5 is removed by a destaticizing device (not shown) provided on a downstream side of the cleaning device 18 with respect to a rotation direction of the photosensitive drum 5.

In an upper portion of the MFP main body 2, the image reading portion 6 is disposed, and a platen (a document holder) 24, which presses and holds a document placed on a contact glass 25 (see FIG. 2) of the image reading portion 6, is provided in an openable-closable manner, and over the platen 24, a document conveyance device 27 is provided.

Further, a control portion (CPU) 90 is disposed within the MFP main body 2, and controls operations of the image forming portion 3, the image reading portion 6, the document conveyance device 27, etc.

Figure 2:
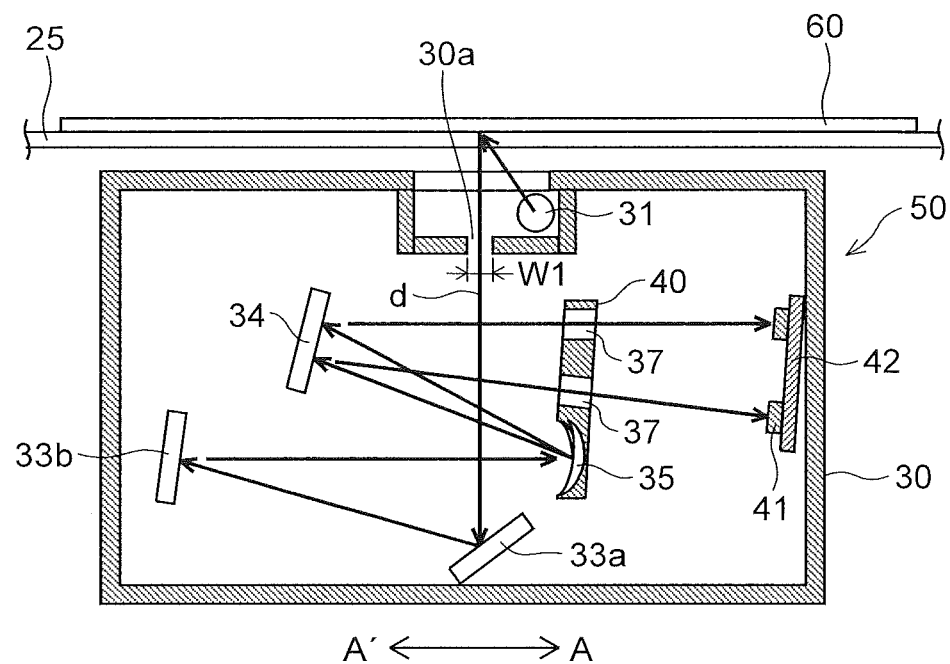
FIG. 2 is a side sectional view of an internal structure of a reading module 50 according to an embodiment of the present disclosure, incorporated in the image reading portion 6.
Figure 3:
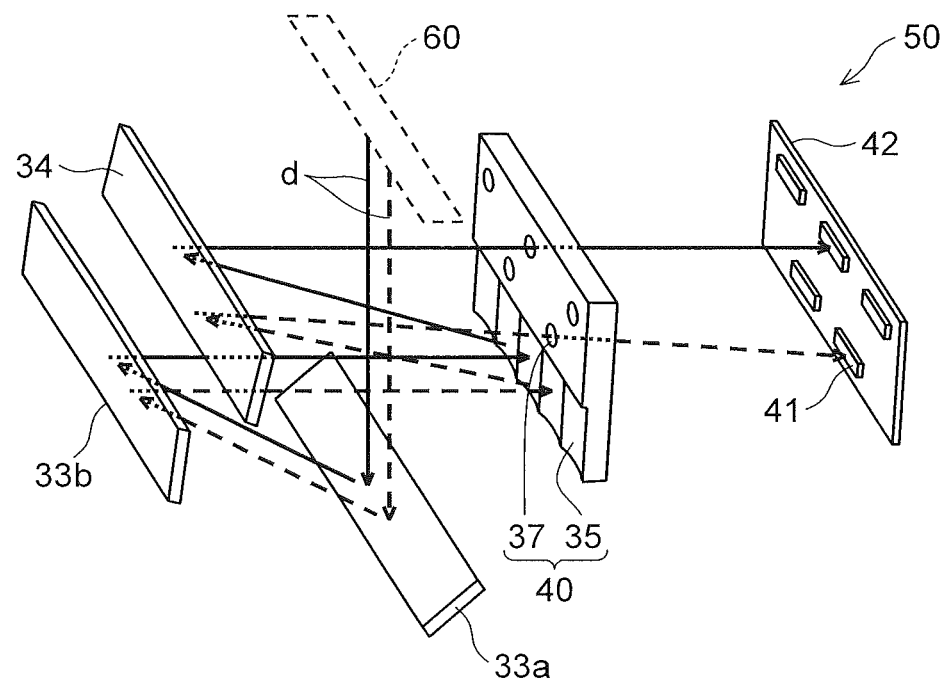
FIG. 3 is a partial perspective view of the internal structure of the reading module 50 according to the embodiment of the present disclosure.
Figure 4:
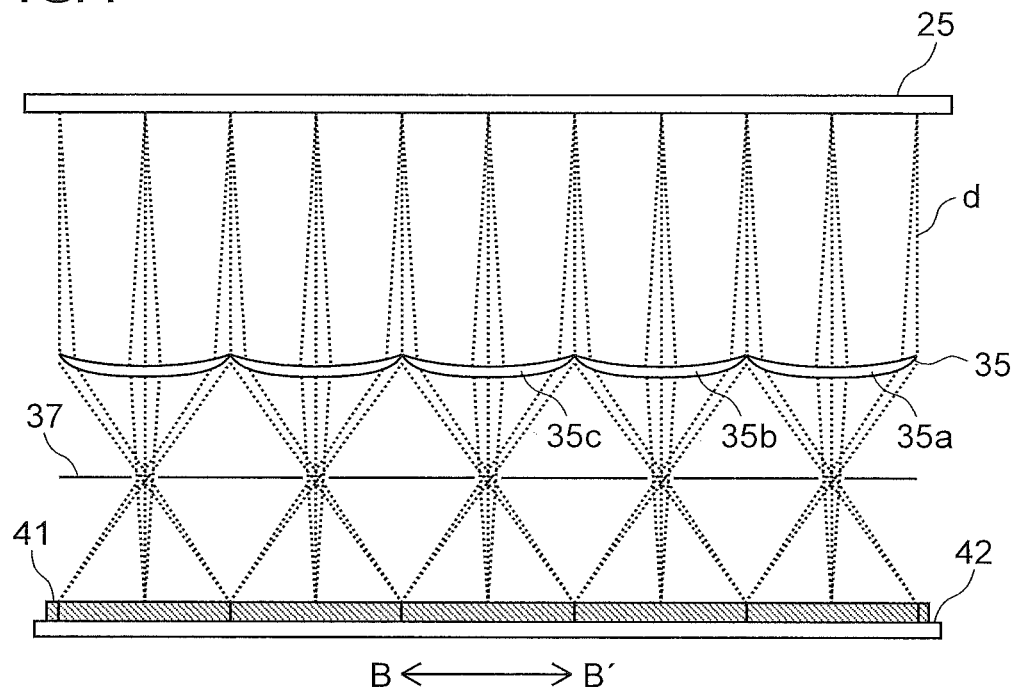
FIG. 4 is a plan sectional view of a configuration between an optical unit 40 and a sensor 41 in the reading module 50 according to the embodiment of the present disclosure.

FIG. 2 is a side sectional view of an internal structure of a reading module 50 according to an embodiment of the present disclosure incorporated in the image reading portion 6. FIG. 3 is a partial perspective view of the reading module 50 according to the present embodiment, illustrating an optical path from a document 60 to a sensor 41. FIG. 4 is a plan sectional view showing a configuration between an optical unit 40 and the sensor 41 in the reading module 50 according to the present embodiment. Although a mirror array 35 constituting the optical unit 40 in FIG. 4 reflects rays of light, for the sake of convenience of description, FIG. 4 shows a model where rays of light are transmitted through the optical unit 40.

The reading module 50 reads an image on a front side (a lower side in FIG. 2) of the document 60 placed on the contact glass 25 while moving in a sub-scanning direction (an arrow AA' direction). The reading module 50 also reads an image on the front side of the document 60 conveyed by the document conveyance device 27 (see FIG. 1) while remaining stationary right under an automatic reading position of the contact glass 25.

As illustrated in FIG. 2, the reading module 50 includes, in a housing 30 thereof, a light source 31, plane mirrors 33a and 33b, a mirror array 35 including a plurality of reflection mirrors each having a reflection surface formed as an aspherical concave surface, a turning mirror (a first turning mirror, a second turning mirror) 34, an aperture stop portion 37, and the sensor 41 as reading means. The sensor 41 is supported on a sensor substrate 42 (see FIG. 4). The reading module 50 has a home position right under a shading plate (not shown) provided for acquiring white reference data.

With this configuration, procedure of image reading performed to read a document image in a fixed-document manner is as follows. First, the document 60 is placed on the contact glass 25 with an image side down. Then, the reading module 50 is caused to move at a predetermined speed from a scanner home side to a scanner return side while irradiating the image side of the document 60 with light emitted from the light source 31. As a result, light reflected from the image side of the document 60 becomes image light d (indicated by solid arrows in FIG. 2), passes through a slit portion 30a which defines a passage region for light, has its optical path changed by the plane mirror 33a, and is then reflected by the plane mirror 33b toward the mirror array 35. The reflected image light d is condensed by the mirror array 35, is again reflected by the turning mirror 34, and passes through the aperture stop portion 37 to be imaged on the sensor 41. At the sensor 41, the image light d, which has been thus imaged, is divided into pixels to be converted into electric signals corresponding to the densities of individual pixels.

On the other hand, procedure of image reading performed to read a document image in a sheet-through manner is as follows. The reading module 50 is moved to right under an image reading region (an image reading position) of the contact glass 25. Then, the image side of one of document sheets, which are conveyed one sheet after another while being lightly pressed against the image reading region by the document conveyance device 27, is irradiated with light from the light source 31, and meanwhile, image light d reflected from the image side is imaged on the sensor 41 via the plane mirrors 33a and 33b, the mirror array 35, the turning mirror 34, and the aperture stop portion 37.

As illustrated in FIG. 3, the mirror array 35 and the aperture stop portion 37 are integrally formed with each other of the same material, being unitized as the optical unit (an optical system) 40. By integrally forming the mirror array 35 and the aperture stop portion 37 with each other, it is possible to hold positions of the mirror array 35 and the aperture stop portion 37 relative to each other with high accuracy. Thus, it is possible to effectively prevent degradation of imaging performance due to variation of the relative positions resulting from expansion or contraction of the mirror array 35 and the aperture stop portion 37 under temperature variation.

The turning mirror 34 is disposed at a position facing the mirror array 35, and reflects rays of light (the image light d) reflected from the mirror array 35, and directs the rays of light into the aperture stop portion 37.

The aperture stop portion 37 is a circular opening, and adjusts an amount of the image light d to be imaged on the sensor 41.

As illustrated in FIG. 4, the mirror array 35, which images the image light d on the sensor 41, has a configuration in which a plurality of reflection mirrors 35a, 35b, 35c, . . . , which correspond to predetermined regions of the sensor 41, are connected together in an array in the main scanning direction (an arrow BB' direction).

According to the configuration of the present embodiment, the image light d reflected from respective reading regions Ra, Rb, . . . (see FIG. 5) of the document 60 divided in the main scanning direction has its optical path changed by the plane mirrors 33a and 33b (see FIG. 2), to be incident on the reflection mirrors 35a, 35b, 35c . . . of the mirror array 35. The image light d is reflected from the reflection mirrors 35a, 35b, 35c, . . . at a unity imaging magnification, is reflected again by the turning mirror 34 to pass through the aperture stop portion 37, and is then focused on corresponding imaging regions of the sensor 41 to form inverted images.

Since the inverted images formed on the imaging regions are converted into digital signals, data of the imaging regions are turned around into erect images, and then the images of the imaging regions are connected together to thereby form an output image.

The aperture stop portion 37 is arranged at focal points of the reflection mirrors 35a, 35b, 35c, . . . constituting the mirror array 35, and thus a physical separation distance (a distance in an up-down direction in FIG. 2) between the aperture stop portion 37 and the mirror array 35 depends upon a reduction magnification (here, a unity magnification), and so on, of the mirror array 35. In the reading module 50 of the present embodiment, the turning mirror 34 reflects rays of light; with this configuration, it is possible to secure the optical path length from the mirror array 35 to the aperture stop portion 37, and thus to reduce incidence and reflection angles of the image light d with respect to the mirror array 35. As a result, it is possible to reduce occurrence of curvature of images that are formed in the imaging regions 41a, 41b, . . . (see FIG. 5).

In a compound-eye reading method in which the mirror array 35 is used like in the present embodiment, if the imaging magnification varies with the document position (the optical path length between the reflection mirrors and the document) within the regions corresponding to the reflection mirrors 35a, 34b, 35c . . . , a defective image is formed in a case of the document 60 floating off the contact glass 25.

In the present embodiment, between the document 60 and the mirror array 35, a telecentric optical system is adopted such that a principal ray of the image light d is parallel to the optical axis. The telecentric optical system has a feature that the principal ray of the image light d that passes through a center of the aperture stop portion 37 is orthogonal to a document surface. With this configuration, imaging magnifications of the reflection mirrors 35a, 35b, 35c . . . do not vary even when the document position varies, and thus it is possible to obtain a reading module 50 having a deep depth of field and free from image bleeding even when the document 60 is read by being divided into small regions. Here, however, it is necessary to keep the principal ray orthogonal to the document surface regardless of the document position, and this requires a mirror array 35 having a size in the main scanning direction that is equal to or larger than that of the document.

In the compound-eye reading method in which the mirror array 35 is used as described above, in a case where the imaging regions 41a, 41b, . . . of the sensor 41 are continuously provided in the main scanning direction, when the image light d reflected from each of the reflection mirrors 35a, 35b, 35c, . . . to pass through the aperture stop portion 37 is imaged in a predetermined region on the sensor 41, the image light d outside the reading region may become incident, as stray light, on a region adjacent to the predetermined region on the sensor 41.

Figure 5:
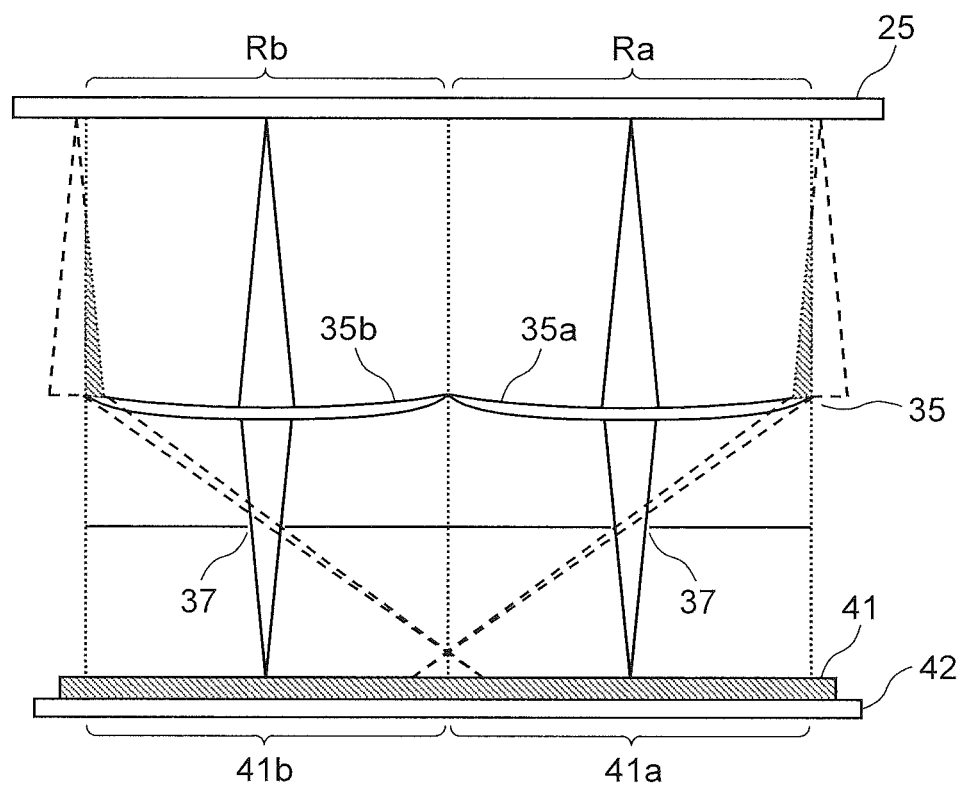
FIG. 5 is a diagram illustrating how image light d is incident on the sensor 41 as stray light.

FIG. 5 is a diagram illustrating how the image light d is incident on the sensor 41 as stray light. As illustrated in FIG. 5, light from the reading regions Ra and Rb respectively corresponding to the reflection mirrors 35a and 35b are respectively imaged in the corresponding imaging regions 41a and 41b on the sensor 41. Here, in the case where the imaging regions 41a, 41b, . . . of the sensor 41 are continuously provided in the main scanning direction, rays of light (hatched regions in FIG. 5) that travel from outside the reading regions Ra and Rb which travel inside the principal ray are imaged on the sensor 41 by the reflection mirrors 35a and 35b. Specifically, the rays reflected from the reflection mirror 35a are incident on the adjacent imaging region 41b, and the rays reflected from the reflection mirror 35b are incident on the adjacent imaging region 41a. These rays of the image light, although they are low in intensity, form inverted images corresponding to inappropriate reading regions, and thus, when they are superimposed on proper images which are appropriately formed in the imaging regions 41a and 41b, they cause a defective image.

Figure 6:
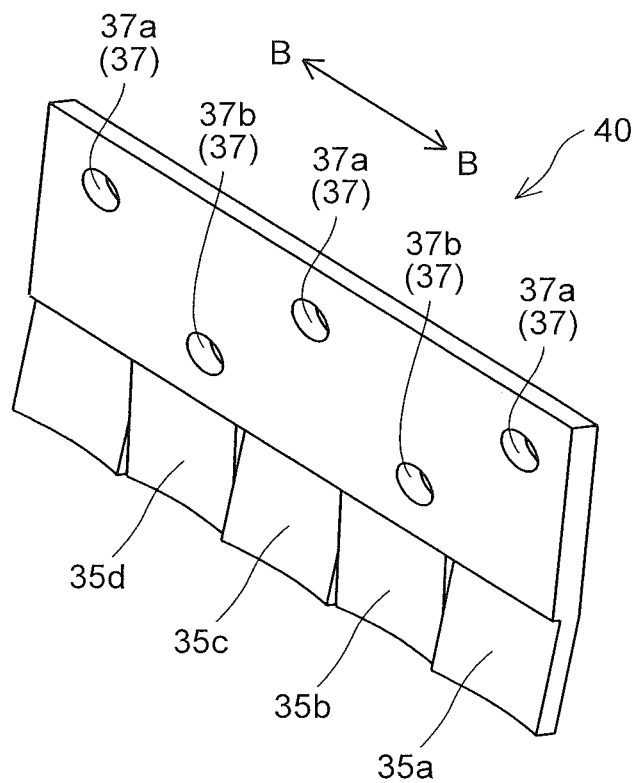
FIG. 6 is a partial perspective view of a configuration of the optical unit 40 in the reading module 50 according to the embodiment of the present disclosure.
Figure 7:
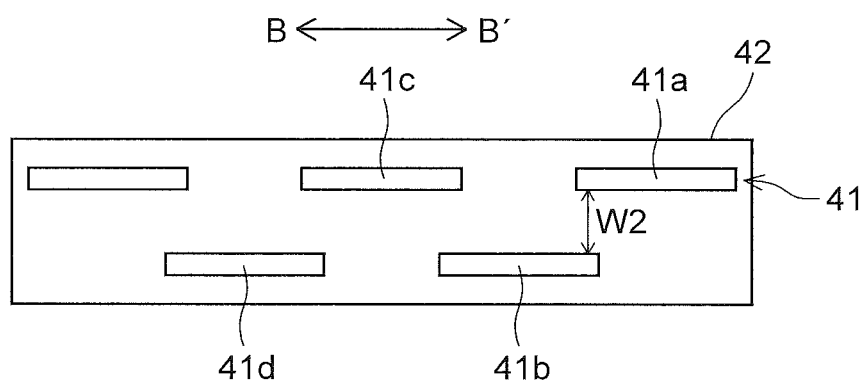
FIG. 7 is a diagram illustrating a configuration including the sensor 41 and a sensor substrate 42 of the reading module 50 according to the embodiment of the present disclosure.

Thus, in the present embodiment, as illustrated in FIG. 6, the reflection mirrors 35a, 35b, 35c, . . . are each provided so as to reflect the image light d at an angle that is different, as seen in the main scanning direction (the arrow BB' direction), from an angle at which an adjacent one of the reflection mirrors 35a, 35b, 35c, . . . reflects the image light d. Further, as illustrated in FIG. 7, the imaging regions 41a, 41b, . . . are each disposed not to overlap with an adjacent one of the imaging regions 41a, 41b, . . . in an orthogonal direction (the up-down direction) which is orthogonal to the main scanning direction.

Specifically, as illustrated in FIG. 2 and FIG. 6, the plurality of reflection mirrors 35a, 35b, 35c, . . . include reflection mirrors that reflect the image light d at a first angle and reflection mirrors that reflect the image light d at a second direction, as seen in the main scanning direction, and the reflection mirrors that reflect the image light d at the first angle and the reflection mirrors that reflect the image light d at the second angle are alternately disposed. That is, the reflection mirrors 35a, 35c, . . . are provided so as to reflect the image light d at the first angle, and the reflection mirrors 35b, 35d, . . . are provided so as to reflect the image light d at the second angle, as seen in the main scanning direction.

The plurality of reflection mirrors 35a, 35b, 35c, . . . are provided so as to reflect the image light d toward one side (an upper side) of the principal ray of the image light d in the up-down direction. Further, the reflection mirrors 35a, 35c, . . . are provided so as to reflect the image light d in a direction more upward than a direction in which the reflection mirrors 35b, 35d, . . . reflect the image light d.

As the aperture stop portion 37, a plurality of aperture stop portions 37 are disposed on one side (an upper side) in the up-down direction with respect to the mirror array 35. The plurality of aperture stop portions 37 are arranged in a staggered fashion, and include a plurality of first aperture stop portions 37a and a plurality of second aperture stop portions 37b, which are disposed alternately on one side (an upper side) or on the other side (a lower side) in the up-down direction. The first aperture stop portions 37a are disposed so as to receive the image light d from the reflection mirrors 35a, 35c, . . . , and the second aperture stop portions 37b are disposed so as to receive the image light d from the reflection mirrors 35b, 35d, . . . .

The first aperture stop portions 37a and the second aperture stop portions 37b are disposed such that the optical path length from the reflection mirrors 35a, 35c, . . . to the first aperture stop portions 37a and the optical path length from the reflection mirrors 35b, 35d, . . . to the second aperture stop portions 37b are equal to each other.

The turning mirror 34 reflects the image light d (light reflected at the first angle) from the refection mirrors 35a, 35c, . . . toward the first aperture stop portions 37a, and reflects the image light d (light reflected at the second angle) from the reflection mirrors 35b, 35d, . . . toward the second aperture stop portions 37b. That is, the turning mirror 34 functions not only as a first turning mirror which reflects the image light d from the reflection mirrors 35a, 35c, . . . toward the first aperture stop portions 37a, but also as a second turning mirror which reflects the image light from the reflection mirrors 35b, 35d, . . . toward the second aperture stop portions 37b. Note that the image light d traveling through each of the first aperture stop portions 37a toward the sensor 41 and the image light d traveling through each of the second aperture stop portions 37b toward the sensor 41 are not parallel to each other.

As illustrated in FIG. 7, the plurality of imaging regions 41a, 41b, . . . are arranged in a staggered fashion. Here, two rows (one including the imaging regions 41a, 41c, . . . , and the other including imaging regions 41b, 41d, . . . ) in which the imaging regions 41a, 41b, . . . are alternately arranged in the main scanning direction are disposed in the up-down direction. Note that the imaging regions 41a, 41c, . . . each receive the image light d that has passed through the first aperture stop portions 37a, and the imaging regions 41b, 41d, . . . each receive the image light d that has passed through the second aperture stop portions 37b.

The imaging regions 41a, 41c, . . . are disposed to be spaced from the imaging regions 41b, 41d, . . . by a predetermined distance in the up-down direction. It is preferable that the imaging regions 41a, 41c, . . . and the imaging regions 41b, 41d, . . . be disposed to be spaced from each other by a distance W2, which is equal to or more than a slit width W1 (a length in the arrow AA' direction, which is 3 mm, for example) of the slit portion 30a (see FIG. 2).

The imaging regions 41a, 41b, . . . are each disposed without any space from an adjacent one of the imaging regions 41a, 41b, . . . in the main scanning direction (the arrow BB' direction). Here, the imaging regions 41a, 41b, . . . are each disposed to overlap slightly with an adjacent one of the imaging regions 41a, 41b, . . . in the main scanning direction.

Furthermore, the imaging regions 41a, 41c, . . . and the imaging regions 41b, 41d, . . . are disposed such that the optical path length from the first aperture stop portions 37a to the imaging regions 41a, 41c, . . . and the optical path length from the second aperture stop portions 37b to the imaging regions 41b, 41d, . . . are equal to each other. Note that each of the imaging regions 41a, 41b, . . . is not disposed orthogonal to the principal ray of the image light d incident thereon. The incident angle of the principal ray of the image light d incident on each of the imaging regions 41a, 41c, . . . and the incident angle of the principal ray of the image light d incident on each of the imaging regions 41b, 41d, . . . are set to be substantially equal to each other in size.

In the present embodiment, as described above, the reflection mirrors 35a, 35b, 35c, . . . are each provided so as to reflect light at an angle that is different, as seen in the main scanning direction, from the angle at which an adjacent one of the reflection mirrors 35a, 35b, 35c, . . . reflects light, and the imaging regions 41a, 41b, 41c, . . . are each disposed so as not to overlap with an adjacent one of the imaging regions 41a, 41b, 41c, . . . in the up-down direction. With this configuration, it is possible to reduce light reaching the sensor 41 as flare light (stray light) after being reflected from adjacent ones of the reflection mirrors 35a, 35b, 35c, . . . to pass through the aperture stop portions 37. Thus, it is possible to reduce occurrence of defective images.

The plurality of aperture stop portions 37 are disposed on the upper side with respect to the mirror array 35. With this configuration, it is possible to make the reading module 50 smaller in the up-down direction than in a case where the aperture stop portions 37 (the first aperture stop portions 37a, the second aperture stop portions 37b) are separately disposed on the upper side and the lower side with respect to the mirror array 35.

As described above, of the plurality of reflection mirrors 35a, 35b, 35c, . . . , those which reflect light at the first angle and those which reflect light at the second angle, as seen in the main scanning direction, are alternately disposed. Further, the plurality of imaging regions 41a, 41b, 41c, . . . are arranged in a staggered fashion. In other words, two rows (one including the imaging regions 41a, 41c, . . . , and the other including imaging regions 41b, 41d, . . . ), in which the imaging regions 41a, 41b, 41c . . . are alternately arranged in the main scanning direction, are arranged in the up-down direction. This helps reduce increase in area for disposing the sensor 41 in the up-down direction as compared with a case where three or more such rows of imaging regions are arranged in the up-down direction.

As described above, the turning mirror 34 reflects light that has been reflected at the first angle by the reflection mirrors 35a, 35c, . . . toward the first aperture stop portions 37a, and reflects light that has been reflected at the second angle by the reflection mirrors 35b, 35d, . . . toward the second aperture stop portions 37b. This configuration allows the light coming from the reflection mirrors 35a, 35c, . . . to be easily reflected toward the first aperture stop portions 37a, and allows the light coming from the reflection mirrors 35b, 35d, . . . to be easily reflected toward the second aperture stop portions 37b.

As described above, the turning mirror 34 functions not only as a first turning mirror which reflects the image light d coming from the reflection mirrors 35a, 35c, . . . toward the first aperture stop portion 37a but also as a second turning mirror which reflects the image light d coming from the reflection mirrors 35b, 35d, . . . toward the second aperture stop portions 37b. This helps reduce increase in number of components.

As described above, it is preferable that the imaging regions 41a, 41b, . . . be each disposed to be spaced from an adjacent one of the imaging regions 41a, 41b, . . . in the up-down direction by a distance that is equal to or more than the slit width W1 of the slit portion 30a. With this configuration, it is possible to securely prevent light from reaching the sensor 41 as flare light (stray light) after being reflected from adjacent ones of the reflection mirrors 35a, 35b, 35c, . . . to pass through the aperture stop portions 37.

The embodiments described above are in no way meant to limit the present disclosure, which thus allows for many modifications and variations within the spirit of the present disclosure. For example, although the above embodiments have been described by taking, as an example of an image reading device, the image reading portion 6 incorporated in the image forming apparatus 100, the present disclosure is applicable equally to an image scanner used separately from the image forming apparatus 100.

Although the above descriptions of the embodiments have dealt with examples where the plurality of aperture stop portions 37 are disposed on the upper side with respect to the mirror array 35, but this is not meant to limit the present disclosure, and the plurality of aperture stop portions 37 may be disposed on the lower side with respect to the mirror array 35.

Figure 8:
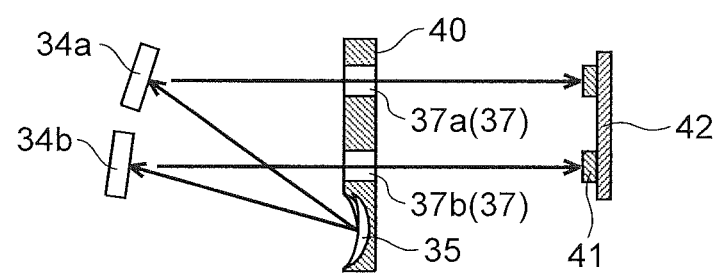
FIG. 8 is a partial sectional view of a modified example of the reading module 50 according to the embodiment of the present disclosure, illustrating a configuration where a first turning mirror 34a and a second turning mirror 34b are provided as separate mirrors.

Although the above descriptions of the embodiments have dealt with examples where the image light d (reflected at the first angle) from the reflection mirrors 35a, 35c, . . . and the image light d (reflected at the second angle) from the reflection mirrors 35b, 35d, . . . are both reflected by the one (common) turning mirror 34, but this is not meant to limit the present disclosure. For example, as in the reading module 50 illustrated in FIG. 8 as a modified example of the present disclosure, the first turning mirror 34a which reflects the image light d coming from the reflection mirrors 35a, 35c, . . . toward the first aperture stop portions 37a and the second turning mirror 34b which reflects the image light d coming from the reflection mirrors 35b, 35d, . . . toward the second aperture stop portions 37b may be provided separate from each other. With this configuration, it is possible to easily make the image light d traveling through the first aperture stop portions 37a toward the sensor 41 and the image light d traveling through the second aperture stop portions 37b toward the sensor 41 parallel to each other.

Furthermore, it is possible to easily make the principal ray of the image light d orthogonally incident on the imaging regions 41a, 41b, . . . .

Although the above descriptions of the embodiments have dealt with examples where the imaging regions 41a, 41c, . . . and the imaging regions 41b, 41d, . . . are provided on the one sensor substrate 42, but this is not meant to limit the present disclosure. The imaging regions 41a, 41c, . . . and the imaging regions 41b, 41d, . . . may be provided on different sensor substrates 42. With this configuration, it is possible to easily make the principal ray of the image light d orthogonally incident on the imaging regions 41a, 41c, . . . and the imaging regions 41b, 41d, . . . .

What is claimed is:

1. A reading module comprising:
  a light source which irradiates a document with light;
  an optical system which images, as image light, reflection light of the light with which the light source has irradiated the document; and
  a sensor having a plurality of imaging regions which convert the image light imaged by the optical system into an electric signal,
  wherein
  the optical system includes
    a mirror array in which a plurality of reflection mirrors, each having a reflection surface formed as an aspherical concave surface, are connected together in an array in a main scanning direction, and
    a plurality of aperture stop portions which are each provided between one of the reflection mirrors and one of the imaging regions of the sensor, and which adjust an amount of the image light reflected from the reflection mirrors,
  the reflection mirrors are each provided so as to reflect light at an angle that is different, as seen in the main scanning direction, from an angle at which an adjacent one of the reflection mirrors reflects light,
  the plurality of aperture stop portions are disposed on one side of the mirror array with respect to an orthogonal direction which is orthogonal to the main scanning direction, and
  the imaging regions are each disposed so as not to overlap with an adjacent one of the imaging regions in the orthogonal direction.

2. The reading module according to claim 1,
  wherein
  the plurality of reflection mirrors include reflection mirrors that reflect light at a first angle and reflection mirrors that reflect light at a second angle, as seen in the main scanning direction, and the reflection mirrors that reflect light at the first angle and the reflection mirrors that reflect light at the second angle are alternately disposed, and
  the plurality of imaging regions are arranged in a staggered fashion.

3. The reading module according to claim 2,
  wherein
  the plurality of aperture stop portions include first aperture stop portions and second aperture stop portions which are disposed alternately on one side and an other side in the orthogonal direction, and
  a first turning mirror which reflects light having been reflected by the reflection mirrors at the first angle toward the first aperture stop portions and a second turning mirror which reflects light having been reflected by the reflection mirrors at the second angle toward the second aperture stop portions are provided.

4. The reading module according to claim 3, wherein
the first turning mirror functions also as the second turning mirror.

5. The reading module according to claim 1, further comprising:
a slit portion which is disposed to face the document and defines a passage region for light reflected from the document,
wherein
the imaging regions are each disposed to be spaced from an adjacent one of the imaging regions in the orthogonal direction by a distance that is equal to or more than a slit width of the slit portion.

6. The reading module according to claim 1, wherein
the mirror array and the aperture stop portions are integrally formed with each other.

7. The reading module according to claim 1, wherein
the optical system is a telecentric optical system where the image light is parallel to an optical axis on a document side of the mirror array, the optical system forming an inverted image on the sensor.

8. The reading module according to claim 7, wherein
image data having been read in the imaging regions of the sensor are reversed into erect images, and then the images in the imaging regions are connected together to form a read image corresponding to the document.

9. An image reading device comprising:
a contact glass secured on an upper surface of an image reading portion;
a document conveyance device which is openable and closable upward and downward with respect to the contact glass, and which conveys a document to an image reading position of the contact glass; and
the reading module according to claim 1 which is disposed below the contact glass so as to be reciprocatable in a sub-scanning direction,
wherein
the reading module is capable of
reading an image of a document placed on the contact glass while moving in the sub-scanning direction, and
reading an image of a document conveyed to the image reading position while remaining stationary at a position facing the image reading position.

10. An image forming apparatus comprising the image reading device according to claim 9.

* * * * *